(12) United States Patent
Sauer et al.

(10) Patent No.: US 9,811,204 B2
(45) Date of Patent: Nov. 7, 2017

(54) TIME MULTIPLEXED TOUCH DETECTION AND POWER CHARGING

(71) Applicant: Apple Inc., Cupertino, CA (US)

(72) Inventors: Christian M. Sauer, Cupertino, CA (US); Todd K. Moyer, Saratoga, CA (US); Robert S. Parnell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/312,437

(22) Filed: Jun. 23, 2014

(65) Prior Publication Data

US 2015/0370410 A1    Dec. 24, 2015

(51) Int. Cl.
*G06F 3/041* (2006.01)
*G06F 3/044* (2006.01)
*H02J 7/00* (2006.01)

(52) U.S. Cl.
CPC ............ *G06F 3/0418* (2013.01); *G06F 3/044* (2013.01); *H02J 7/0093* (2013.01)

(58) Field of Classification Search
CPC ...... G06F 3/044; G06F 3/0418; G06F 3/0416; G06F 3/03545; G06F 3/04883; G06F 3/0412; G06F 1/3206; G06F 1/3212; G06F 1/3262; G06F 1/3265; H02J 7/007; H02J 7/0068
See application file for complete search history.

(56) References Cited

U.S. PATENT DOCUMENTS

| 3,558,917 A | 1/1971 | Crouse |
|---|---|---|
| 4,163,909 A | 8/1979 | Harr |
| 5,223,784 A | 6/1993 | Nelson et al. |
| 5,287,074 A | 2/1994 | Meguro et al. |

(Continued)

FOREIGN PATENT DOCUMENTS

| EP | 1 901 157 A2 | 3/2008 |
|---|---|---|
| EP | 2 104 023 A2 | 9/2009 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Darlene M Ritchie
(74) *Attorney, Agent, or Firm* — Morrison & Foerster LLP

(57) ABSTRACT

A method of scanning a touch sensor panel while the touch sensor panel is coupled to a power adapter is disclosed. The power adapter can charge a battery of a device, but can also introduce or add noise during the process of charging the battery. To prevent adverse effects to the touch sensor panel, while the device is charging, the touch controller can time multiplex touch scan periods and inductive charging periods and can discard touch scans or touch images affected by the noise. Determining whether a touch scan is a bad touch scan can include performing a touch scan across the array of touch pixels and making a determination based on the scan profile. In some examples, the profile can be quantified using different metrics such as the shape, instantaneous slope of tail ends, a full-width half-maximum, and a monotonicity of the curve of the scan profile.

18 Claims, 10 Drawing Sheets

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,491,706 A | 2/1996 | Tagawa et al. |
| 5,610,629 A | 3/1997 | Baur |
| 5,784,036 A | 7/1998 | Higuchi et al. |
| 5,796,256 A | 8/1998 | Fowler et al. |
| 5,825,352 A | 10/1998 | Bisset et al. |
| 5,835,079 A | 11/1998 | Shieh |
| 5,880,411 A | 3/1999 | Gillespie et al. |
| 5,896,120 A | 4/1999 | Iguchi et al. |
| 6,057,910 A | 5/2000 | Dunne |
| 6,081,259 A | 6/2000 | Teterwalk |
| 6,188,391 B1 | 2/2001 | Seely et al. |
| 6,236,386 B1* | 5/2001 | Watanabe ............ G06F 3/0412 345/100 |
| 6,310,610 B1 | 10/2001 | Beaton et al. |
| 6,323,846 B1 | 11/2001 | Westerman et al. |
| 6,411,250 B1 | 6/2002 | Oswald et al. |
| 6,424,338 B1 | 7/2002 | Anderson |
| 6,476,798 B1 | 11/2002 | Bertram et al. |
| 6,549,193 B1 | 4/2003 | Huang et al. |
| 6,587,800 B1 | 7/2003 | Parker et al. |
| 6,657,616 B2 | 12/2003 | Sims |
| 6,690,387 B2 | 2/2004 | Zimmerman et al. |
| 6,765,557 B1 | 7/2004 | Segal et al. |
| 7,015,894 B2 | 3/2006 | Morohoshi |
| 7,024,337 B2 | 4/2006 | Yoda |
| 7,072,804 B2 | 7/2006 | Weller |
| 7,170,501 B2 | 1/2007 | Inamori |
| 7,184,064 B2 | 2/2007 | Zimmerman et al. |
| 7,367,004 B2 | 4/2008 | Katou |
| 7,428,708 B2 | 9/2008 | Okamoto et al. |
| 7,511,702 B2 | 3/2009 | Hotelling |
| 7,538,760 B2 | 5/2009 | Hotelling et al. |
| 7,650,555 B2 | 1/2010 | Imming et al. |
| 7,656,168 B2 | 2/2010 | Mahowald et al. |
| 7,663,607 B2 | 2/2010 | Hotelling et al. |
| 8,040,142 B1 | 10/2011 | Bokma et al. |
| 8,294,687 B1* | 10/2012 | Ksondzyk ............ G06F 3/0418 178/18.01 |
| 8,479,122 B2 | 7/2013 | Hotelling et al. |
| 8,874,396 B1* | 10/2014 | Olson .................... G06F 3/044 345/173 |
| 9,442,597 B2 | 9/2016 | Shih et al. |
| 9,703,422 B2 | 7/2017 | Shih et al. |
| 2002/0089491 A1 | 7/2002 | Willig |
| 2002/0135568 A1 | 9/2002 | Chen |
| 2003/0058929 A1 | 3/2003 | Cox et al. |
| 2003/0197689 A1 | 10/2003 | May |
| 2003/0206162 A1 | 11/2003 | Roberts |
| 2004/0090730 A1 | 5/2004 | Byrne et al. |
| 2004/0100450 A1 | 5/2004 | Choi |
| 2006/0197753 A1 | 9/2006 | Hotelling |
| 2006/0256093 A1 | 11/2006 | Furukawa et al. |
| 2007/0046639 A1 | 3/2007 | Swedin |
| 2008/0030239 A1 | 2/2008 | Sullivan et al. |
| 2008/0165157 A1 | 7/2008 | Fu |
| 2008/0179112 A1 | 7/2008 | Qin et al. |
| 2008/0218129 A1* | 9/2008 | Yun ..................... H02J 7/02 320/148 |
| 2008/0310485 A1 | 12/2008 | Soliman et al. |
| 2009/0085894 A1 | 4/2009 | Gandhi et al. |
| 2009/0202002 A1 | 8/2009 | Yao et al. |
| 2009/0204860 A1 | 8/2009 | Yao et al. |
| 2010/0026656 A1 | 2/2010 | Hotelling et al. |
| 2010/0201314 A1* | 8/2010 | Toncich ................ H02J 7/007 320/108 |
| 2010/0253641 A1 | 10/2010 | Swedin |
| 2011/0069031 A1 | 3/2011 | Fu |
| 2011/0133700 A1* | 6/2011 | Martin .................. H02J 7/0068 320/145 |
| 2011/0157068 A1 | 6/2011 | Parker et al. |
| 2011/0157069 A1* | 6/2011 | Zhuang ................ G06F 3/044 345/174 |
| 2011/0249394 A1* | 10/2011 | Nielsen ................ G06F 1/1632 361/679.41 |
| 2011/0254802 A1* | 10/2011 | Philipp ................ G06F 3/0412 345/174 |
| 2011/0266074 A1* | 11/2011 | Fan ..................... G06F 3/0428 178/18.09 |
| 2012/0043976 A1 | 2/2012 | Bokma et al. |
| 2012/0062479 A1* | 3/2012 | Feldstein ............ G06F 1/1656 345/173 |
| 2012/0071149 A1 | 3/2012 | Bandyopadhyay et al. |
| 2012/0287081 A1* | 11/2012 | Akai .................... G06F 3/044 345/174 |
| 2012/0293445 A1* | 11/2012 | Crandall ............. G06F 3/044 345/174 |
| 2012/0306739 A1* | 12/2012 | Tsuda ................ H04N 21/4122 345/156 |
| 2013/0044076 A1* | 2/2013 | Wang .................. G06F 3/0418 345/174 |
| 2013/0076700 A1* | 3/2013 | Chiu ................... G06F 3/0418 345/179 |
| 2013/0113711 A1 | 5/2013 | Nien et al. |
| 2013/0141346 A1* | 6/2013 | Oh ...................... G06F 3/0418 345/173 |
| 2013/0319137 A1* | 12/2013 | Grau ..................... G06F 3/005 73/862.381 |
| 2014/0028624 A1* | 1/2014 | Marsden ................ G06F 3/044 345/174 |
| 2014/0092061 A1* | 4/2014 | Akai .................... G06F 3/0418 345/174 |
| 2014/0111465 A1 | 4/2014 | Shih |
| 2014/0111467 A1* | 4/2014 | Chen .................... G06F 3/044 345/174 |
| 2014/0132559 A1* | 5/2014 | Kim ..................... G06F 3/0416 345/174 |
| 2014/0168539 A1* | 6/2014 | Kim ..................... G06F 3/041 349/12 |
| 2014/0267059 A1* | 9/2014 | Deokar ................ G06F 3/0416 345/173 |
| 2015/0091865 A1* | 4/2015 | Funayama ............ G06F 3/044 345/174 |
| 2015/0169108 A1* | 6/2015 | Ishii ..................... G06F 3/0418 345/174 |
| 2015/0193070 A1* | 7/2015 | Tilak .................... G06F 3/0416 345/173 |
| 2015/0234519 A1* | 8/2015 | Gowreesunker ........ G06F 3/044 345/174 |
| 2015/0242015 A1* | 8/2015 | Cho .................... G06F 3/044 345/174 |
| 2015/0355767 A1* | 12/2015 | Abe ................... G06F 3/0412 345/174 |
| 2016/0378264 A1 | 12/2016 | Shih et al. |

FOREIGN PATENT DOCUMENTS

| | | |
|---|---|---|
| GB | 2 424 993 A | 10/2006 |
| JP | 2000-076002 A | 3/2000 |
| JP | 2000-163031 A | 6/2000 |
| JP | 2002-342033 A | 11/2002 |
| WO | WO-2005/036510 A1 | 4/2005 |
| WO | WO-2008/085786 A2 | 7/2008 |
| WO | WO-2008/085786 A3 | 7/2008 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

(56) References Cited

OTHER PUBLICATIONS

Anonymous. (2008). "SLIMbus™ Host Controller IP," Arasan Chip Systems, Inc. Version 1.4, URL http://www.arasan.com/products/prod_overview/mipi/SLIMbus_Host_pb.pdf, last visited on Oct. 2, 2008, two pages.
Boyce, K. (2008). "An Introduction to the Mobile Industry Processor Interface (MIPI) Alliance Standard; Serial Low-Power Inter-Chip Media Bus (SLIMbus™)," *National Semiconductor Audio Products Group*, URL https://www.national.com/appinfo/audio/files/intro_to_SLIMbus.pdf, last visited Oct. 2, 2008, 20 pages.
Final Office Action dated May 19, 2011, for U.S. Appl. No. 12/229,685, filed Aug. 25, 2008, 16 pages.
Final Office Action dated Nov. 26, 2012, for U.S. Appl. No. 12/954,557, filed Nov. 24, 2010, 16 pages.
Final Office Action dated May 22, 2013, for U.S. Appl. No. 12/240,692, filed Sep. 29, 2008, 10 pages.
Final Office Action dated Nov. 29, 2013, for U.S. Appl. No. 12/954,557, filed Nov. 24, 2010, 17 pages.
Final Office Action dated Jun. 27, 2014, for U.S. Appl. No. 12/240,692, filed Sep. 29, 2008, 11 pages.
Final Office Action dated Sep. 16, 2015, for U.S. Appl. No. 12/240,692, filed Sep. 29, 2008, 13 pages.
Final Office Action dated Dec. 4, 2015, for U.S. Appl. No. 13/750,847, filed Jan. 25, 2013, 18 pages.
International Search Report dated Dec. 23, 2008, for PCT Application No. PCT/US2007/089165, filed Dec. 28, 2007, three pages.
Non-Final Office Action dated Mar. 19, 2010, for U.S. Appl. No. 11/620,466, 10 pages.
Non-Final Office Action dated Dec. 7, 2010, for U.S. Appl. No. 12/229,685, filed Aug. 25, 2008, 17 pages.
Non-Final Office Action dated Oct. 19, 2011, for U.S. Appl. No. 12/954,557, 21 pages.
Non-Final Office Action dated Mar. 29, 2013, for U.S. Appl. No. 12/954,557, filed Nov. 24, 2010, 16 pages.
Non-Final Office Action dated Feb. 17, 2012, for U.S. Appl. No. 12/229,685, filed Aug. 25, 2008, 18 pages.
Non-Final Office Action dated Dec. 4, 2012, for U.S. Appl. No. 12/240,692, filed Sep. 29, 2008, 10 pages.
Non-Final Office Action dated Feb. 13, 2014, for U.S. Appl. No. 12/240,692, filed Sep. 29, 2008, 10 pages.
Non-Final Office Action dated Feb. 27, 2015, for U.S. Appl. No. 12/240,692, filed Sep. 29, 2008, 12 pages.
Non-Final Office Action dated Apr. 8, 2015, for U.S. Appl. No. 13/750,847, filed Jan. 25, 2013, 15 pages.
Notice of Allowance dated Aug. 11, 2010, for U.S. Appl. No. 11/620,466, four pages.
Notice of Allowance dated May 19, 2016, for U.S. Appl. No. 13/750,847, filed Jan. 25, 2013, 8 pages.
Non-Final Office Action dated Jan. 23, 2017, for U.S. Appl. No. 15/261,678, filed Sep. 9, 2016, 18 pages.
Notice of Allowance dated Mar. 30, 2017, for U.S. Appl. No. 15/261,678, filed Sep. 9, 2016, eight pages.

\* cited by examiner

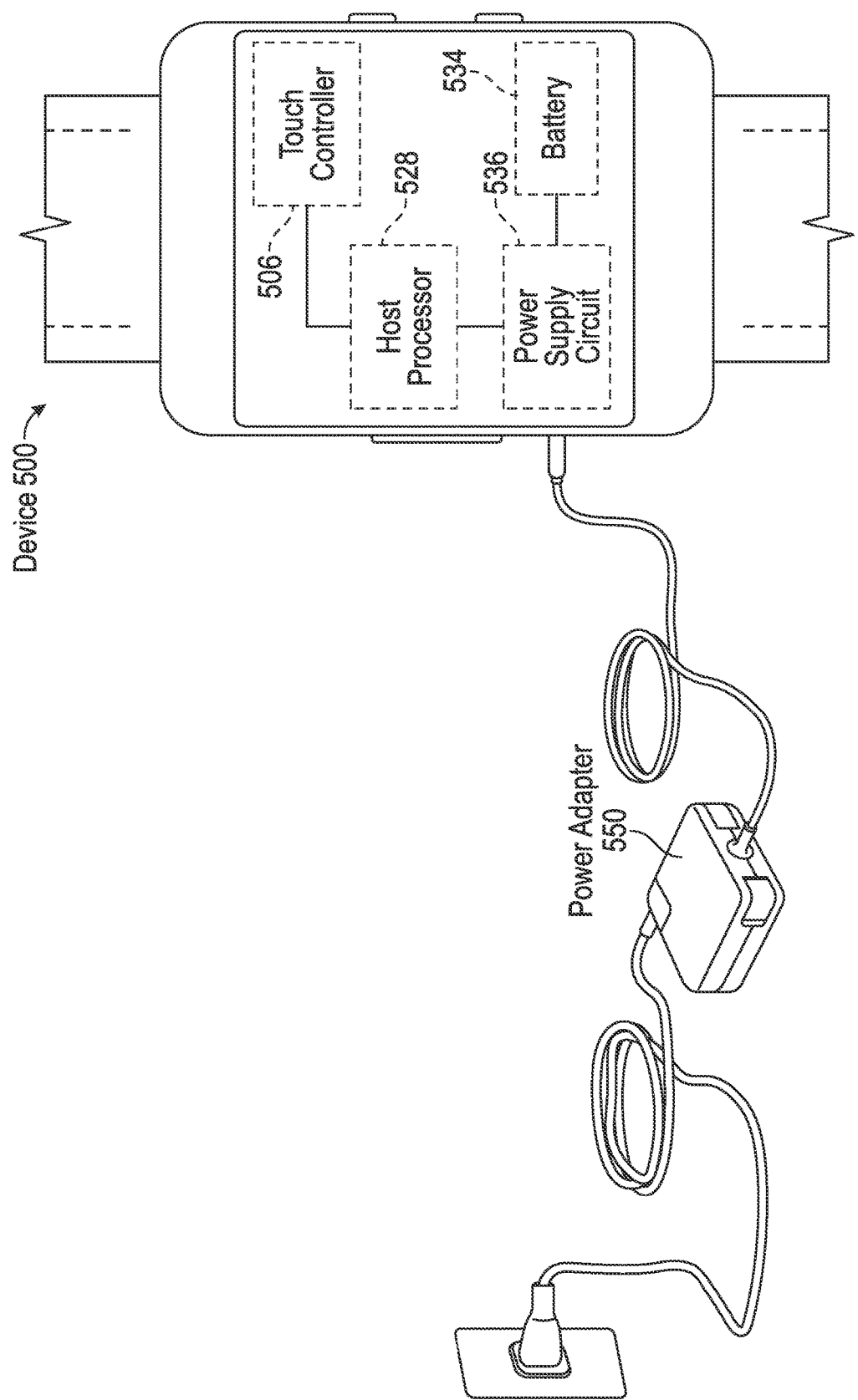

TIME MULTIPLEXED TOUCH DETECTION AND POWER CHARGING

FIELD OF THE DISCLOSURE

This relates generally to touch sensitive devices, and in particular, to a touch scan mode during device charging.

BACKGROUND OF THE DISCLOSURE

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize a touch and position of the touch on the display screen, the computing system can interpret the touch, and thereafter, perform an action based on the touch event.

One limitation of touch sensor panel technologies is that noise can adversely affect the performance of a touch sensor panel device. Noise from sources such as a power adapter or an inductive charger can influence the results of a touch sensor panel device. For example, the touch sensor panel device can be coupled to a power adapter or inductive charger to charge a battery on the device. The charger can introduce noise while charging, which can prevent a touch sensor panel from distinguishing between a touch event (e.g., a user's contact of a touch sensor panel) and noise influencing the sensors of the touch sensor panel.

SUMMARY

This relates to time multiplexed touch detection and power charging of touch sensitive devices. A power adapter or an inductive charger can charge a battery of a device, but can also introduce or add noise during the process of charging the battery. Touch pixels of a touch sensitive device can be stimulated by noise from the charger, and can adversely affect one or more components, such as the touch sensor panel. To prevent adverse effects to the touch sensor panel, while the device is charging, the touch controller can time multiplex touch scan periods and inductive charging periods and can discard touch scans or touch images affected by the noise.

BRIEF DESCRIPTION OF THE DRAWINGS

FIG. 5 illustrates an exemplary configuration of a device coupled to a charger according to examples of the disclosure.

DETAILED DESCRIPTION

Figure 1C:
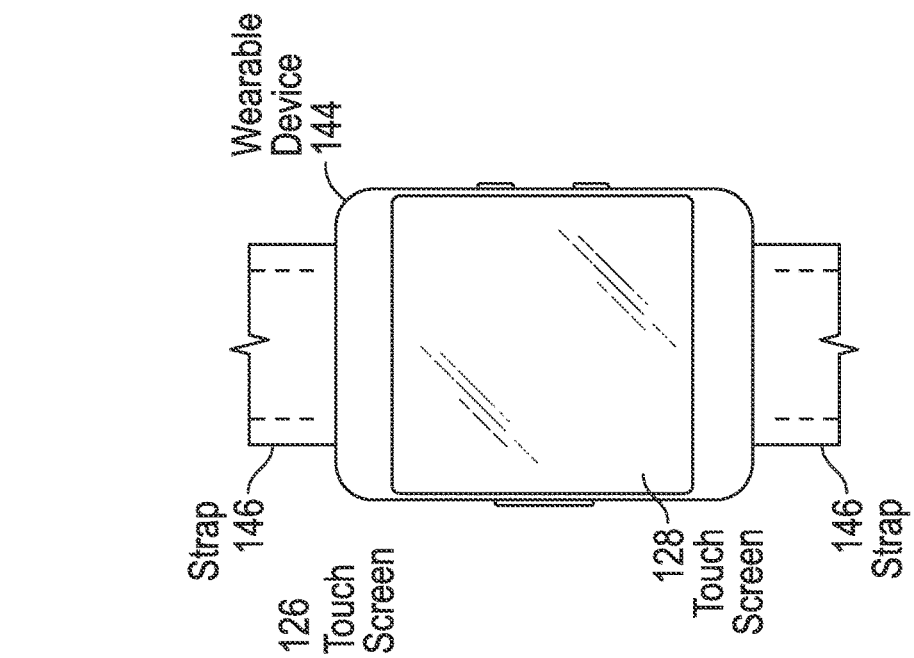
FIGS. 1A-1C illustrate systems in which examples of the disclosure can be implemented.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps can be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Touch-sensitive screens ("touch screens" or "touchscreens") can be used in many electronic devices to display graphics and text and to provide a user interface through which a user can interact with the devices. A touch screen can detect and respond to contact on the touch screen. A device can display one or more soft keys, menus, and other user-interface objects on the touch screen. A user can interact with the device by contacting the touch screen at locations corresponding to the user-interface object with which the user wishes to interact.

This disclosure relates to time multiplexed touch detection and power charging of touch sensitive devices. A power adapter or inductive charger can charge a battery of a device, but can also introduce or add noise during the process of charging the battery. Inductive charging can introduce a significant amount of noise due to the extremely strong carrier signal during the charging time. Touch pixels of a touch sensitive device can be stimulated by noise from the power adapter or inductive charger, and can adversely affect one or more components, such as the touch sensor panel. To prevent adverse effects to the touch sensor panel, while the device is charging, the touch controller can time multiplex touch scan periods and inductive charging periods and can discard touch scans or touch images affected by the noise.

Figure 1B:
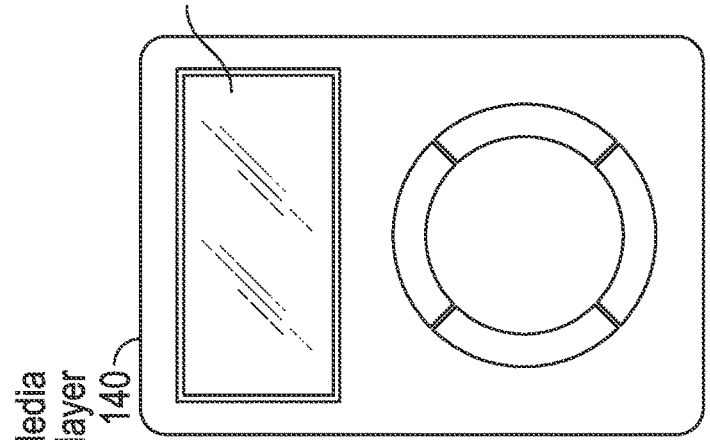
Figure 1A:
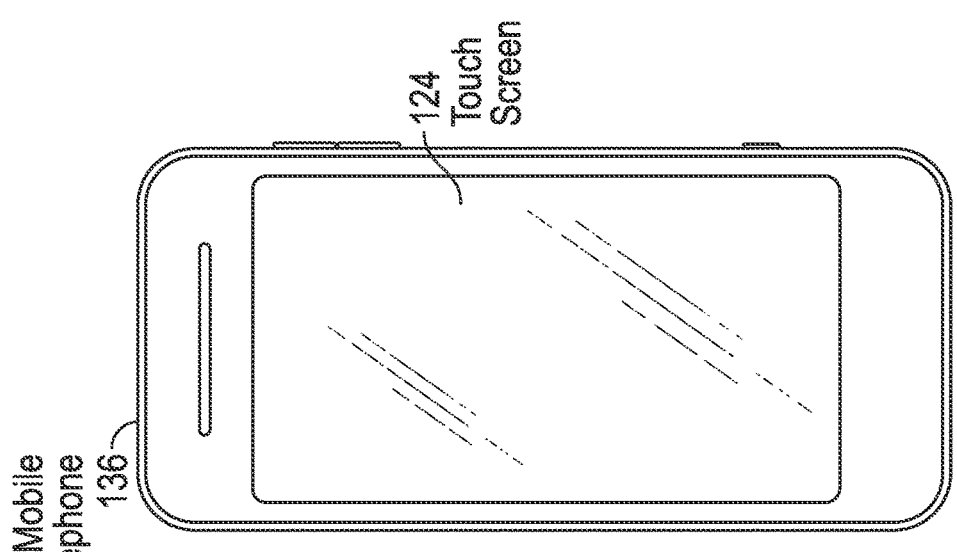

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using strap 146. The systems of FIGS. 1A-1C can utilize the one or more time multiplexing methods, as will be disclosed.

Figure 2:
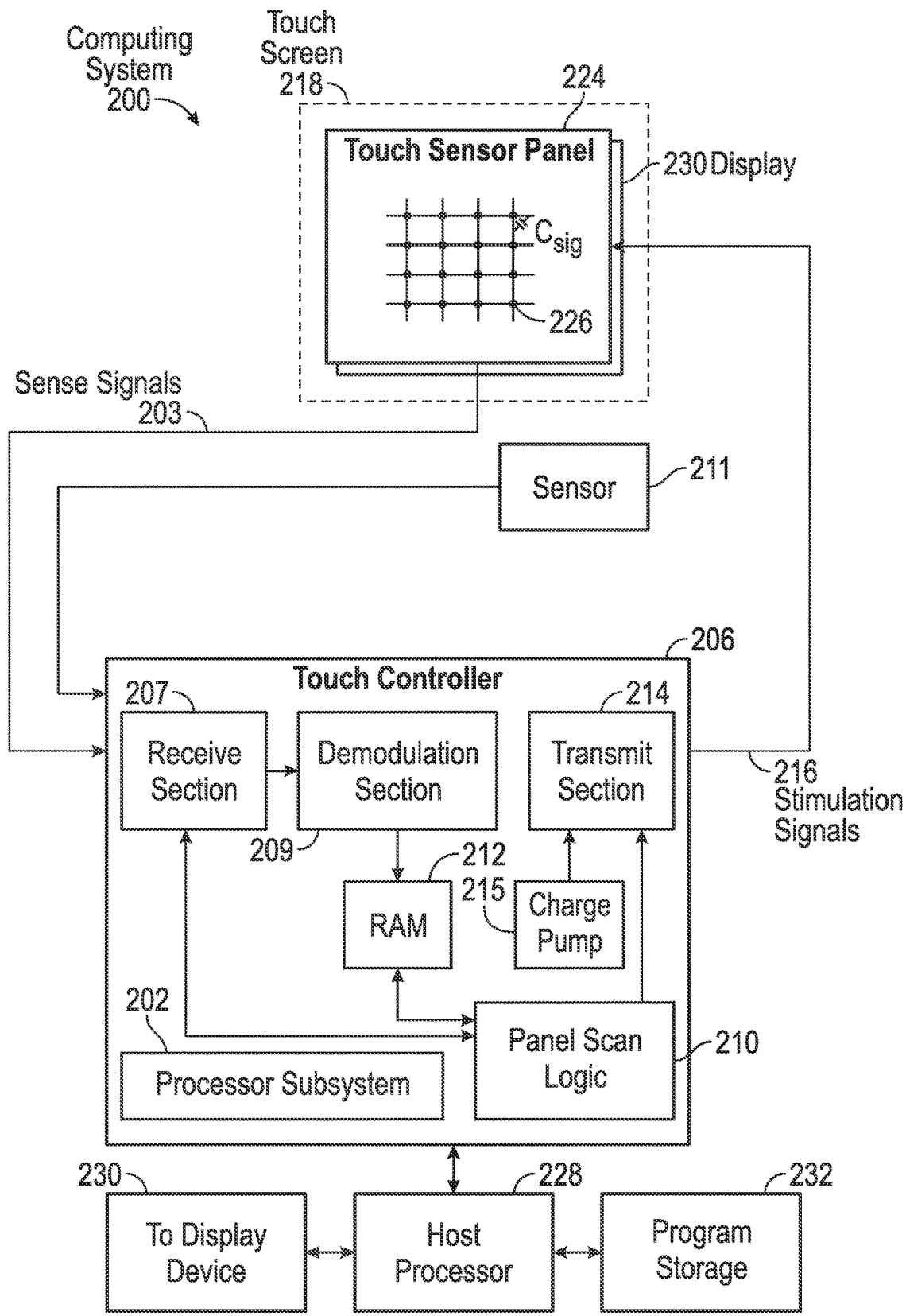
FIG. 2 illustrates an exemplary computing system utilizing the one or more time multiplexing methods according to various examples of the disclosure.

FIG. 2 illustrates an exemplary computing system utilizing the one or more time multiplexing methods according to various examples of the disclosure. Computing system 200 can be included in any electronic device such as the one or more exemplary devices illustrated in FIGS. 1A-1C. Touch controller 206 can be a single application specific integrated circuit (ASIC) that can include one or more processor subsystems such as processor subsystem 202, which can include, for example, one or more main processors, such as ARM968 processors or other processors with similar functionality and capabilities. However, in other examples, some of the processor functionality can be implemented instead by dedicated logic, such as a state machine. Processor subsystem 202 can also include, for example, peripherals such as random access memory (RAM) 212 or other types of memory or storage, watchdog timers (not shown), and the like. Touch controller 206 can also include, for example, receive section 207 for receiving signals, such as touch sense signals 203, from the sense lines of touch sensor panel 224, and other signals from other sensors such as sensor 211, etc. Touch controller 206 can also include, for example, a demodulation section 209, panel scan logic 210, and a drive system including, for example, transmit section 214. Panel scan logic 210 can access RAM 212, autonomously read data from the sense channels, and provide control for the sense channels. In addition, panel scan logic 210 can control transmit section 214 to generate stimulation signals 216 at various frequencies and phases that can be selectively applied to the drive lines of the touch sensor panel 224.

Charge pump 215 can be used to generate the supply voltage for the transmit section. Stimulation signals 216 (Vstim) can have amplitudes higher than the maximum voltage the ASIC process can tolerate by cascading transistors. Therefore, using charge pump 215, the stimulus voltage can be higher (e.g., 6V) than the voltage level a single transistor can handle (e.g., 3.6 V). Although FIG. 2 shows charge pump 215 separate from transmit section 214, the charge pump can be part of the transmit section.

Touch sensor panel 224 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g., the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as touch pixel or node 226, which can be particularly useful when touch sensor panel 224 is viewed as capturing an "image" of touch. (In other words, after touch controller 206 has determined whether a touch event has been detected at each touch sensor in the touch sensor panel, the pattern of touch sensors in the multi-touch sensor panel at which a touch event occurred can be viewed as an "image" of touch (e.g., a pattern of fingers touching the panel.) The capacitance between drive and sense electrodes can appear as stray capacitance when the given row is held at direct current (DC) voltage levels and as a mutual capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 200 can also include host processor 228 for receiving outputs from processor subsystem 202 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Host processor 228 can perform additional functions that may not be related to panel processing, and can be coupled to program storage 232 and display 230, such as an LCD display, for providing a user interface to a user of the device. In some examples, host processor 228 can be a separate component from touch controller 206, as shown. In some examples, host processor 228 can be included as part of touch controller 206. In some examples, the functions of host processor 228 can be performed by processor subsystem 202 and/or distributed among other components of touch controller 206. Display 230 together with touch sensor panel 224, when located partially or entirely under the touch sensor panel 224, can form touch screen 218.

Note that one or more of the functions described above can be performed, for example, by firmware stored in memory (e.g., one of the peripherals) and executed by processor subsystem 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figure 3A:
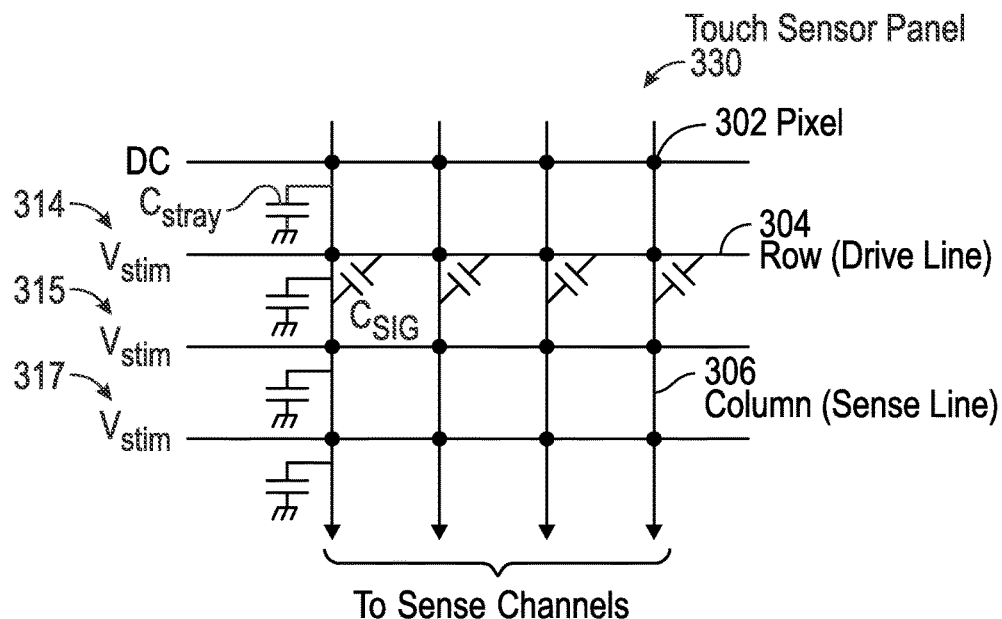
FIG. 3A illustrates an exemplary mutual capacitance touch sensor panel according to examples of the disclosure.

FIG. 3A illustrates an exemplary mutual capacitance touch sensor panel according to examples of the disclosure. Stray capacitance Cstray can be present at each pixel 302 located at the intersection of a row 304 and a column 306 trace (although Cstray for only one column is illustrated in FIG. 3A for purposes of simplifying the figure) of touch sensor panel 330. In the example of FIG. 3A, AC stimuli Vstim 314, Vstim 315 and Vstim 317 can be at different frequencies and phases. Each stimulation signal on a row can cause a charge Qsig=Csig×Vstim to be injected into the columns through the mutual capacitance present at the affected pixels. A change in the injected charge (Qsig_sense) can be detected when a finger, palm or other object is present at one or more of the affected pixels. Vstim signals 314, 315 and 317 can include one or more bursts of sine waves. Note that although FIG. 3A illustrates rows 304 and columns 306 as being substantially perpendicular, they need not be aligned, as described above. As described above, each column 306 can be connected to a receive channel such as receive section 207 of FIG. 2.

Figure 3B:
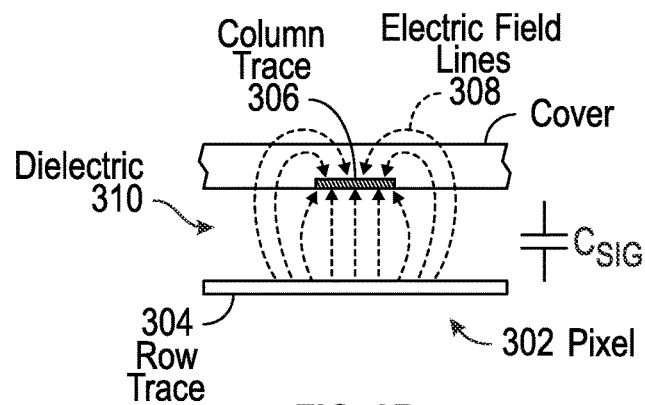
FIG. 3B illustrates a side view of an exemplary pixel in a steady-state (no-touch) condition according to examples of the disclosure.

FIG. 3B illustrates a side view of an exemplary pixel in a steady-state (no-touch) condition according to examples of the disclosure. In FIG. 3B, electric field lines 308 between a column trace 306 and a row trace 304 separated by dielectric 310 is shown at pixel 302.

Figure 3C:
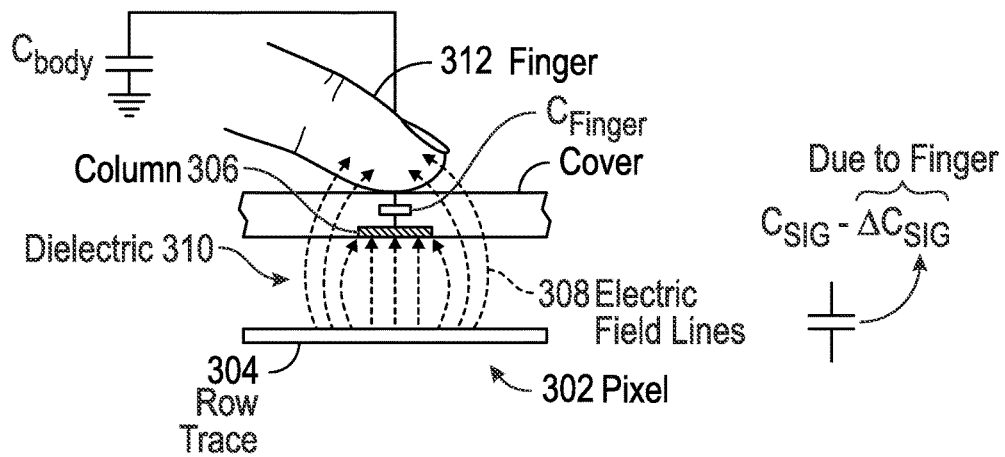
FIG. 3C illustrates a side view of an exemplary pixel in a dynamic (touch) condition according to examples of the disclosure.

FIG. 3C illustrates a side view of an exemplary pixel in a dynamic (touch) condition. An object such as finger 312 can be placed near pixel 302. Finger 312 can be a low-impedance object at signal frequencies, and can have an AC capacitance Cfinger from the column trace 306 to the body. The body can have a self-capacitance to ground Cbody of about 200 pF, where Cbody can be much larger than Cfinger. If finger 312 blocks some electric field lines 308 between row and column electrodes (those fringing fields that exit the dielectric 310 and pass through the air above the row electrode), those electric field lines can be shunted to ground through the capacitance path inherent in the finger and the body, and as a result, the steady state signal capacitance Csig can be reduced by ΔCsig. In other words, the combined body and finger capacitance can act to reduce Csig by an amount ΔCsig (which can also be referred to herein as Csig_sense), and can act as a shunt or dynamic return path to ground, blocking some of the electric field lines as resulting in a reduced net signal capacitance. The signal capacitance at the pixel becomes Csig-ΔCsig, where ΔCsig represents the dynamic (touch) component. Note that Csig-ΔCsig may always be nonzero due to the inability of a finger, palm or other object to block all electric fields, especially those electric fields that remain entirely within the dielectric material. In addition, it should be understood that as finger 312 is pushed harder or more completely onto the touch sensor panel, finger 312 can tend to flatten, blocking more and more of the electric fields lines 308, and thus ΔCsig can be variable and representative of how completely finger 312 is pushing down on the panel (i.e., a range from "no-touch" to "full-touch").

Figure 4A:
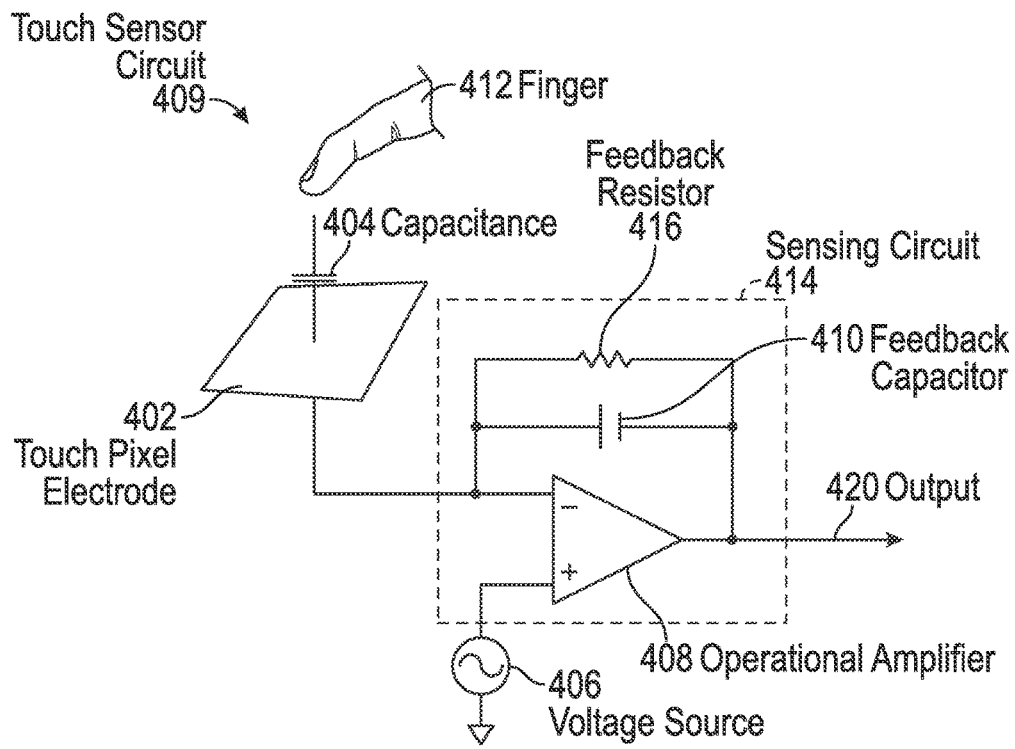
FIG. 4A illustrates an exemplary touch sensor circuit corresponding to a self-capacitance touch pixel electrode and sensing circuit according to examples of the disclosure.

FIG. 4A illustrates an exemplary touch sensor circuit corresponding to a self-capacitance touch pixel electrode and sensing circuit according to examples of the disclosure. Touch sensor circuit 409 can have a touch pixel electrode 402 with an inherent self-capacitance to ground associated with it, and also an additional self-capacitance to ground that can be formed when an object, such as finger 412, is in proximity to or touching the touch pixel electrode 402. The total self-capacitance to ground of touch pixel electrode 402 can be illustrated as capacitance 404. Touch pixel electrode 402 can be coupled to sensing circuit 414. Sensing circuit 414 can include an operational amplifier 408, feedback resistor 416, feedback capacitor 410 and an input voltage source 406, although other configurations can be employed. For example, feedback resistor 416 can be replaced by a switch capacitor resistor. Touch pixel electrode 402 can be coupled to the inverting input of operational amplifier 408. An AC voltage source 406 can be coupled to the non-inverting input of operational amplifier 408. Touch sensor circuit 409 can be configured to sense changes in the total self-capacitance 404 of touch pixel electrode 402 induced by finger 412 either touching or in proximity to the touch sensor panel. Output 420 can be used by a processor to determine a presence of a proximity or touch event, or the output can be inputted into a discreet logic network to determine the presence of a touch or proximity event.

Figure 4B:
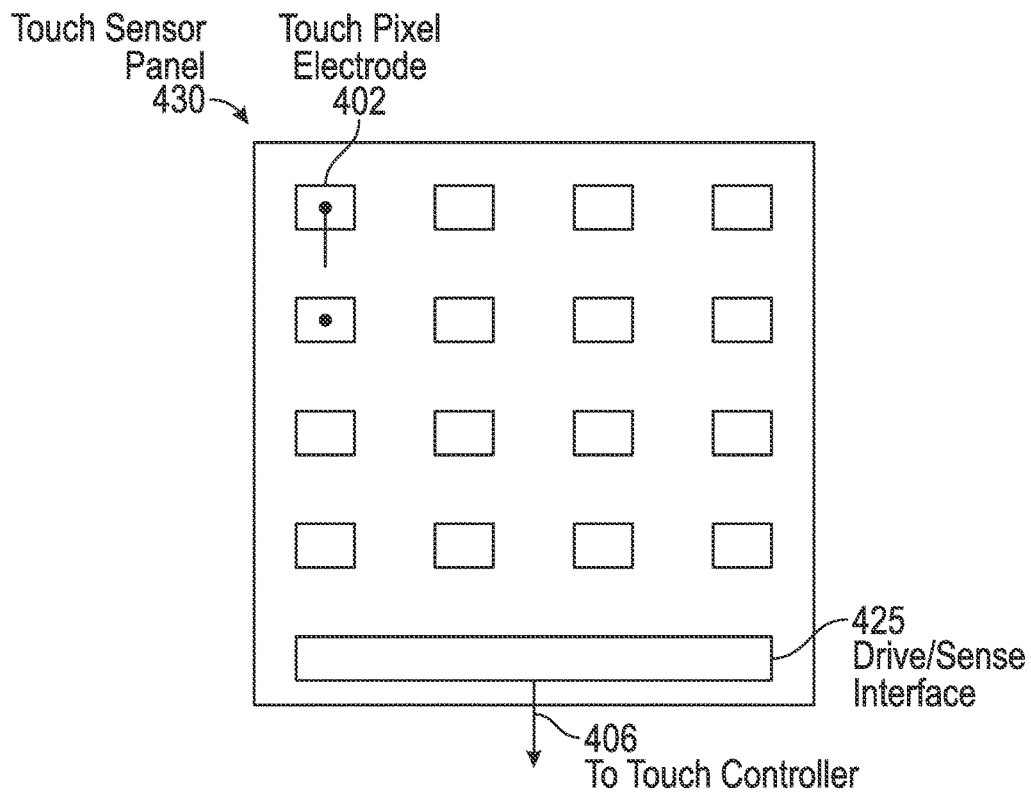
FIG. 4B illustrates an exemplary self-capacitance touch sensor panel according to examples of the disclosure.

FIG. 4B illustrates an exemplary self-capacitance touch sensor panel according to examples of the disclosure. Touch sensor panel 430 can include a plurality of touch pixel electrodes 402 coupled to sense channels in touch controller 406, can be driven by stimulation signals from the sense channels through drive/sense interface 425, and can be sensed by the sense channels through the drive/sense interface 425 as well. After touch controller 406 has determined an amount of touch detected at each touch pixel electrode 402, the pattern of touch pixels in the touch screen panel at which touch occurred can be thought of as an "image" of touch (e.g., a pattern of fingers touching the touch screen).

FIG. 5 illustrates an exemplary configuration of a device coupled to a charger according to examples of the disclosure. Device 500 can be a portable electronic device that can include data processing, storage and display components that are integrated (i.e., embedded or otherwise made an operating part of the device) into the device and are powered by a battery 534. The term "battery" is used generically here to refer to a rechargeable power system such as a fuel cell system that can be replenished by being coupled to an external power source or charger such as power adapter 550. Battery 534 can be, for example, a Lithium ion battery. In some examples, the charger can be any source that provides power to the battery and can include charging through a wired or wireless connection.

Device 500 can include a power supply circuit 536. Power supply circuit 536 can be coupled to various components of device 500 such as host processor 528. Power supply circuit 536 can draw current from battery 534 and can supply the current to the rest of the components of device 500. Power supply circuit 536 can also include a switching voltage regulator and/or a dc-dc converter, to maintain a regulated power supply voltage needed by the components.

Power supply circuit 536 can also include a power management unit to perform various power management functions. The power management functions can include detecting whether or not device 500 is coupled to power adapter 550, monitoring available energy in battery 534, and notifying host processor 528 of a low battery state. The power supply circuit 536 can detect whether or not device 500 is coupled to power adapter 550 by monitoring an input voltage level, for example. If the input voltage level is above a predetermined value, the power supply circuit 536 can determine that device 500 is coupled to power adapter 550. If the input voltage is level is below the predetermined value, the power supply circuit 536 can determine that device 500 is not coupled to power adapter 550. In response to receiving the low notification, host processor 528 can perform any number of functions including switching to a low power consumption mode.

Power adapter 550 can introduce or add noise during the process of charging battery 534 or while power adapter 550 is coupled to device 500. A touch pixel, such as touch pixel 302 of FIG. 3A and touch pixel electrode 402 of FIG. 4A, stimulated by a noise source, such as power adapter 550, can adversely affect one or more components, such as the touch sensor panel. In some examples, power adapter 550 can inform power supply circuit 536 that a charge is being supplied instead of, or in addition to, the power supply circuit 536 detecting that the device 500 is coupled to power adapter 550. For example, the charger can send a predetermined message to device 500. If the power adapter 550 is coupled to device 500, the predetermined message can be received by power supply circuit 536 and can serve as an indication of a charge being supplied.

In some examples, the stimulating noise source can cause false touch readings for untouched locations on the touch sensor panel. This can occur when the noise source stimulates a sensor from the sensor location currently being stimulated by a drive line at an untouched location in the touch sensor panel. Since different sensors can share the same sense line in certain touch sensor panel configurations, a false touch event can be indicated when a panel-stimulated signal generated on a sense line by a sensing element at a non-touched sensor is combined with a noise-stimulated signal generated on the same sense line by a sensing element at a different touch sensor. Since a touch event is indicated at the intersection between the panel-stimulated drive line and the touch-indicating sense line, the panel can incorrectly identify a touch at the untouched location. In some examples, the stimulating noise source can cause saturation of analog touch detection circuitry, thereby preventing the circuitry from recognizing a touch event.

In some examples, the touch location can be calculated using an algorithm that utilizes detected capacitance values from multiple touch pixels. The algorithm can return a touch location with a resolution higher than the number of pixels. The stimulating noise source can lead to erroneous touch locations.

Figure 6A:
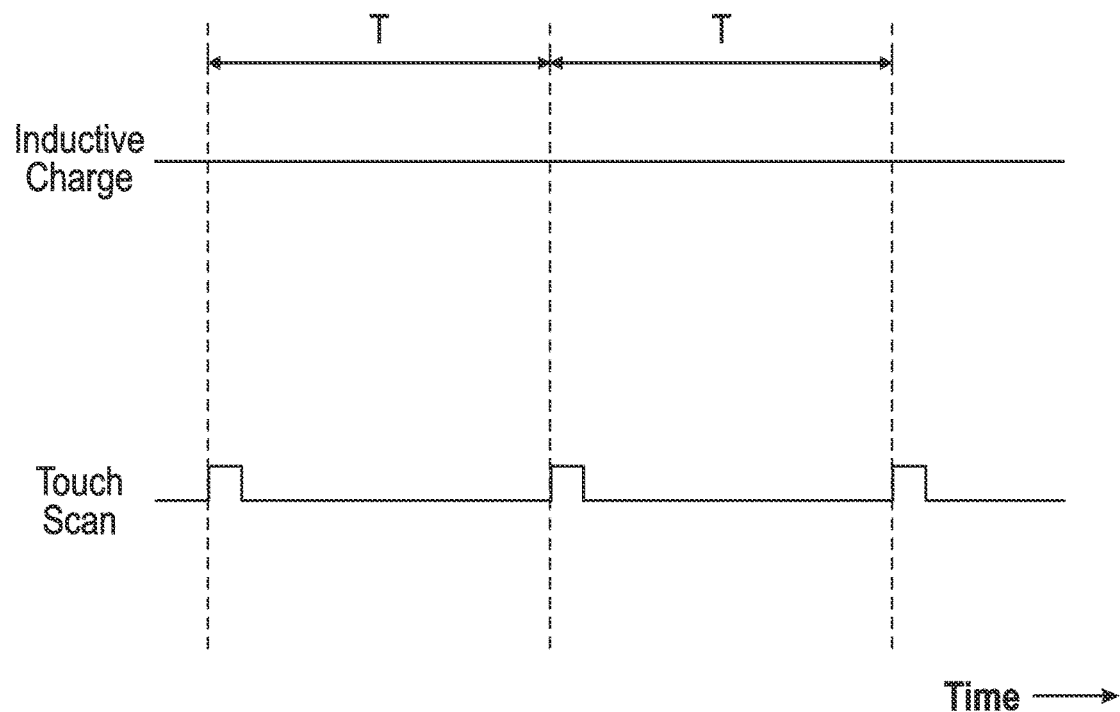
FIG. 6A illustrates an exemplary touch scan while a device is not charging.
Figure 6B:
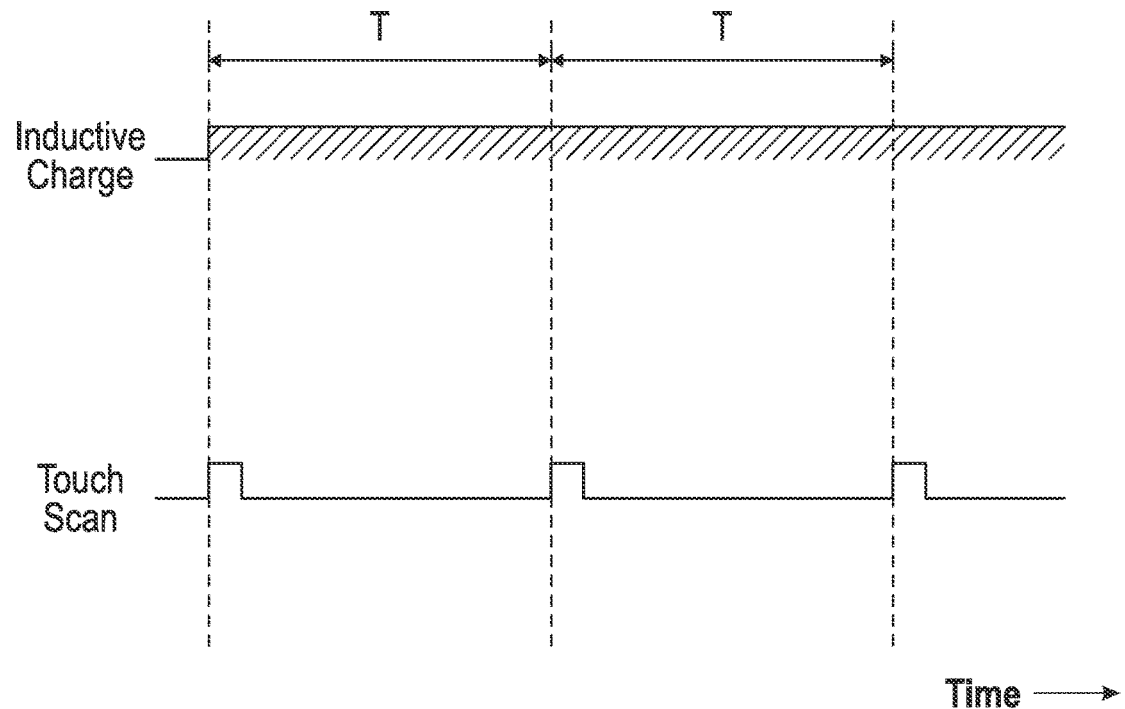
FIG. 6B illustrates an exemplary touch scan affected by noise from a charger according to examples of the disclosure.

To prevent adverse effects to the touch sensor panel while the device is charging, the touch controller or processor can time multiplex touch scan periods and inductive charging periods. FIG. 6A illustrates an exemplary touch scan while a device is not charging. Touch sensing can operate at a suitable frequency with a touch scan time period T. For example, the frequency can be 60 Hz and the touch scan time period T can be less than 16.66 milliseconds. Every touch scan time period T, the touch controller can perform a scan for an object touching or hovering over the touch surface when the touch scan signal shown in FIG. 6A is high. If, however, the device is connected to an inductive charger, the inductive waveform from the inductive charger can interfere with the touch scan. The noise from the inductive waveform can corrupt the touch signal, as shown in FIG. 6B.

Figure 6C:
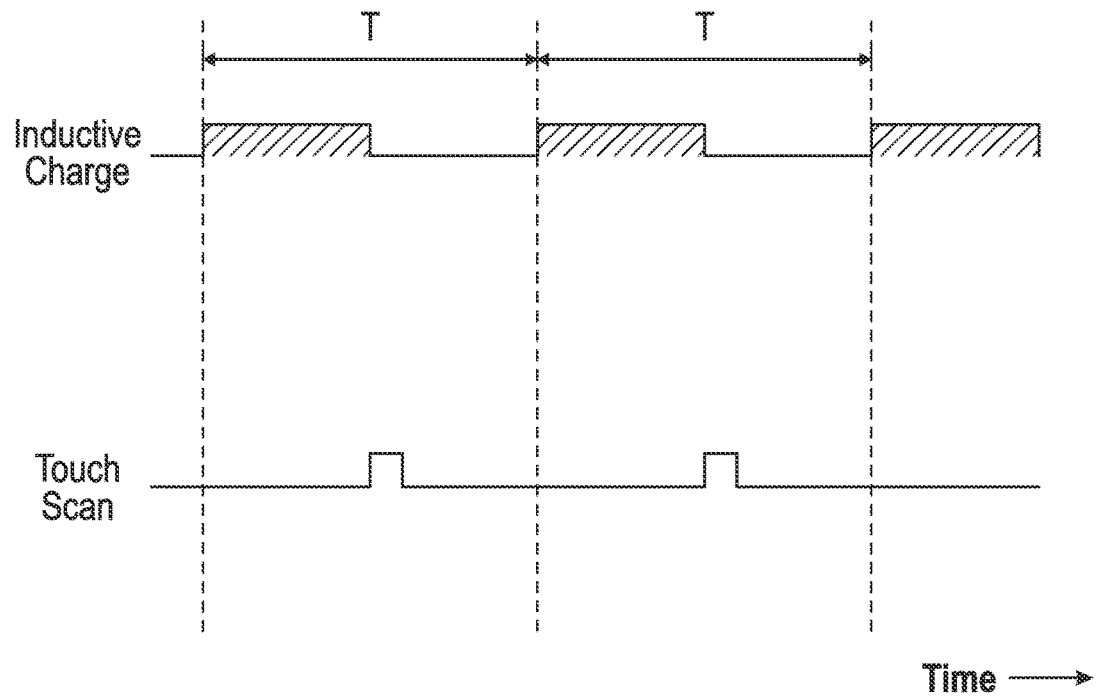
FIG. 6C illustrates an exemplary time multiplexed touch detection and power charging according to examples of the disclosure.

One way to prevent corrupt touch signals due to noise from the charger or inductive charger can be to perform a touch scan during periods when the charger is not charging, as shown in FIG. 6C. The charger can duty cycle its charging periods, and the touch controller can perform a scan during "clean," charge-free periods. While this method could lead to noise-free touch scans, the touch controller may not know when the clean, charge-free periods will occur.

Another way to prevent corrupt touch signals can be to have the host processor tell the inductive charger to turn off its inductive power during touch scans. One issue with having the host processor communicate to the charger can be the processing load required to enable and execute such communication.

Figure 7A:
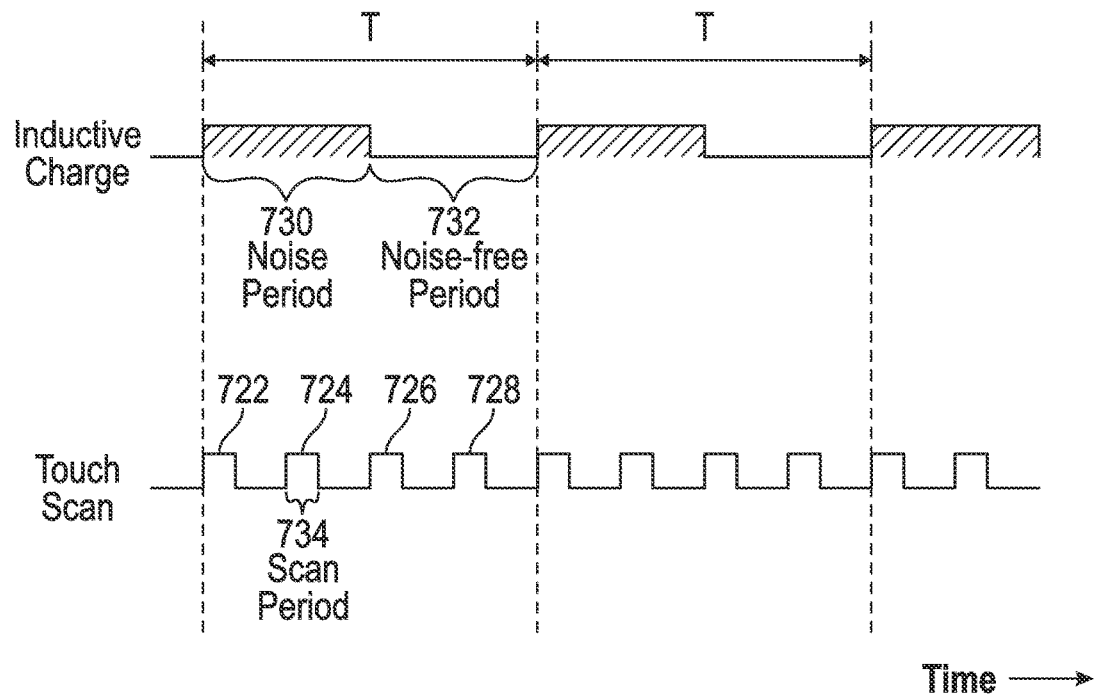
FIG. 7A illustrates an exemplary time multiplexed touch detection and power charging according to examples of the disclosure.
Figure 7B:
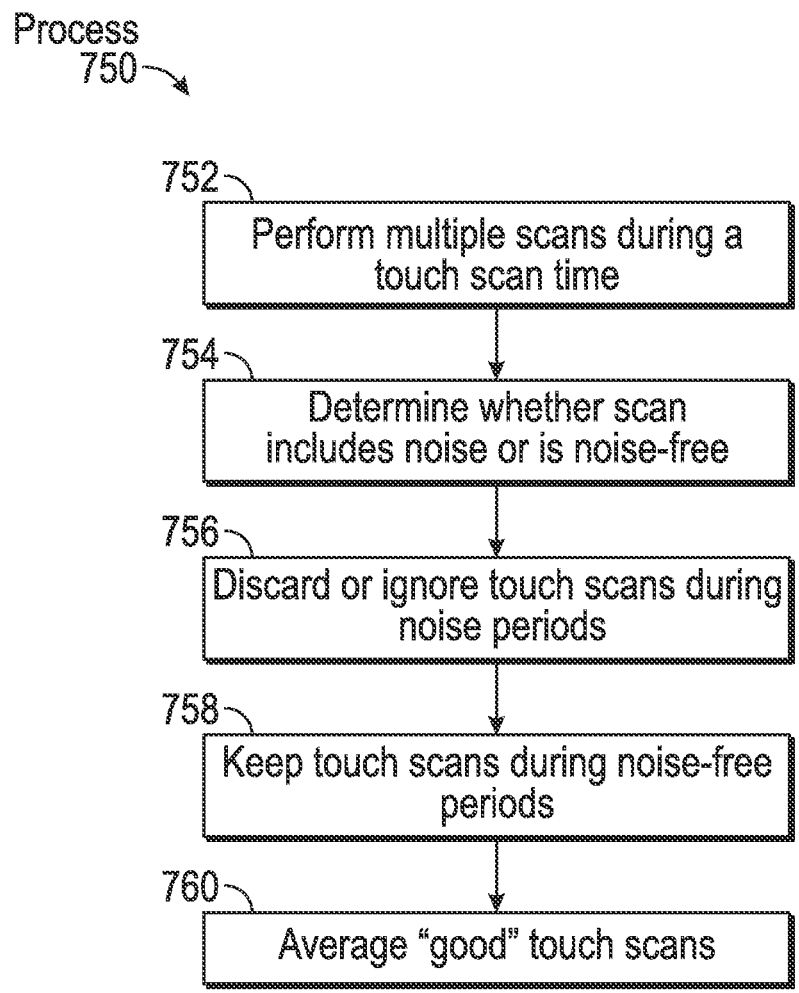
FIG. 7B illustrates a process for an exemplary time multiplexed touch detection and power charging according to examples of the disclosure.

FIG. 7A illustrates an exemplary touch scan and FIG. 7B illustrates a process for time multiplexed touch detection and power charging according to examples of the disclosure. The touch controller can perform multiple scans during a touch scan period or an inductive charging period T (step 752 of process 750). Some of the touch scans can be performed during a noise period 730 (i.e., a period with inductive charging), and some of the touch scans can be performed during a noise-free period 732 (i.e., a period with no inductive charging). In some examples, the duty cycle of the inductive charging can be less than the duty cycle of the touch scan.

The touch controller (or processor) can determine whether each scan is includes noise or is noise-free (step 754). The touch controller can discard or ignore the touch scans performed during a noise period (step 756), and can keep the touch scans performed during a noise-free period (step 758). For example, touch controller can discard "bad" touch scans 722 and 724 during noise period 730, while keeping "good" touch scans 726 and 728 during noise-free period 732. In some examples, the touch controller can keep one touch scan performed during a noise-free period 732 (such as touch scan 726) and can discard any remaining touch scans performed during the same noise-free period 732 (such as touch scan 728). In some examples, touch controller can average a plurality of touch scans (such as touch scans 726 and 728) during a noise-free period 732 (step 760) by averaging the touch values of individual touch pixels in the plurality of scans.

In some examples, the scan period 734 can be decreased (i.e., less than a scan period when the device is not connected to a charger) and the number of touch scans within the touch scan period T can be increased (i.e., greater than the number of touch scans when the device battery is not connected to a power adapter or inductive charger) when the device is coupled to the power adapter or the inductive charger. For example, the number of touch scans within the touch scan time T of FIG. 7A is four. If the touch controller determines that the number of good scans (those entirely in noise-free period 732) is less than a predetermined number, then the touch controller can increase the number of touch scans within the touch scan period T.

In some examples, the scan period 734 and number of touch scans within the touch scan period T can be based on the total charge time (i.e., time duration or percentage charge required to reach 100% battery life) and power consumption. For example, if the battery has a 10% battery life (i.e., 90% charge required to reach 100% battery life), the power adapter or inductive charger can increase the duty cycle for inductive charging (i.e., noise-free period 732 is decreased) in order to reduce the time required to reach 100% battery life. As a result, the number of touch scans may need to be increased in order to achieve good touch scans during the noise-free period 732. In some examples, the number of touch scans within the touch scan period T can lead to a significant amount of power consumption, causing an increased time required to reach 100% battery life. If the device determines that this increased time is greater than a predetermined number, then the number of touch scans can be reduced.

Figure 8A:
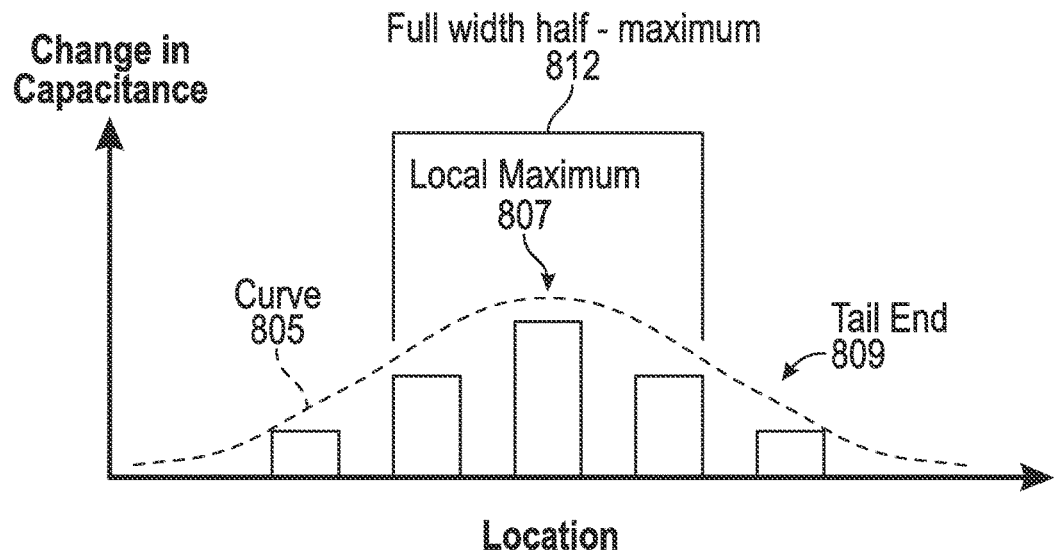
FIG. 8A illustrates a touch scan profile of a noise-free touch image according to examples of the disclosure.

Determining whether a touch scan is a bad touch scan can include performing a touch scan across the array of touch pixels and making a determination based on the scan profile. FIG. 8A illustrates a touch scan profile of a noise-free touch image on a touch sensor panel according to examples of the disclosure. Each touch pixel can have a measured change in capacitance value, where the measurements closer to the center of an object touching or hovering over the touch screen surface can be greater than measurements further from the center (i.e., the change in capacitance value can be higher at locations where the object is blocking electric field lines).

The profile of a noise-free touch image can be exhibit a profile as shown in FIG. 8A with a curve 805, such as a Gaussian curve, for example. Curve 805 can have a local maximum 807, which can represent the center of the object, for example. Curve 805 can also have tail ends 809 on either side of local maximum 807. The profile can be quantified using different metrics such as the instantaneous slope of tail ends 809, a full-width half-maximum 812, and a monotonicity of curve 805. In some examples, the profile can characteristics indicative of a plurality of touches such as a two-finger touch. The two-finger touch profile can resemble two curves such as curve 805 located side-by-side.

Figure 8B:
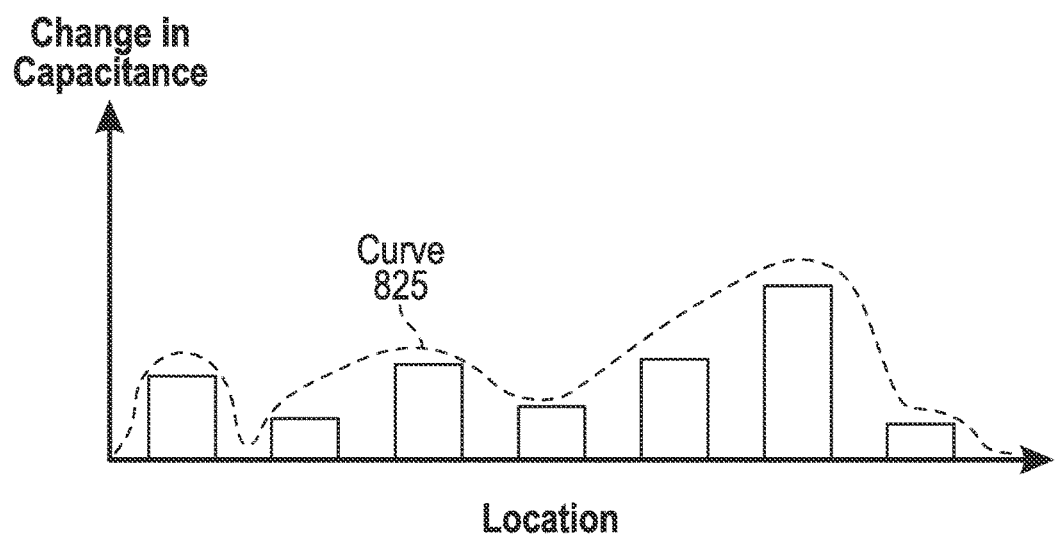
FIG. 8B illustrates a touch scan profile of a touch image affected by noise according to examples of the disclosure.

FIG. 8B illustrates a touch scan profile of a touch image affected by noise according to examples of the disclosure. The touch controller can discard touch scans that have a profile such as the profile shown by curve 825. Curve 825 may not exhibit certain characteristics such as the instantaneous slope of tail ends, full-width half-maximums, and monotonicity values that curve 805 exhibits. Curve 825 can represent a no touch, touch, or false touch measured during the noise period.

In some examples, the profile of the touch image can be stored in a memory. The touch controller can compare a profile of a touch image with a history of profiles, and a determination whether a touch is corrupted by noise can be made based on the comparison. For example, the curve of an untouched surface can be flat or can exhibit characteristics of a noisy signal such as random fluctuations. In some examples, the history of profiles can include a profile with a predetermined curve. In some examples, the touch controller can keep track of the number of bad scans or percentage of bad scans relative to the number of total scans. Based on the number of bad scans or percentage of bad scans to the total scans, the touch controller can dynamically change the scan period (such as scan period 734), the touch scan frequency, the number of touch scans within a touch scan time, and/or the inductive charging frequency.

In some examples, the determination of a bad touch scan can be based on a single touch point along the array or a subset of touch pixels. In some examples, determination of a bad touch scan can be based on all of the touch points. In some examples, touch points located substantially near the edges of the touch screen or touch sensor panel can be discarded.

In some examples, the touch controller can perform multiple scans on a single pixel. Determination of a bad or good touch scan can be time based. The capacitance value from the single pixel can be compared to a capacitance value from the same pixel during a previous time. If the capacitance value at any given time is not substantially the same as the mean or median value, then the touch scan can be a bad touch scan.

By time multiplexing the touch scan periods and inductive charging periods (i.e., touch charge mode), the touch controller can receive touch images that are not corrupted by noise. However, time multiplexing can also lead to a longer charge time (i.e., the amount of time to reach 100% battery life) than when not time multiplexing (i.e., charging the entire time). As such, in some examples, the host processor can send a notification to the power supply circuit when a touch is no longer detected. In response to the notification, the power supply circuit can notify the charger, and the charger can switch to charging the entire time or a substantial amount of the entire time (i.e., a normal charge mode).

In some examples, the charger can charge using a normal charge mode. When the touch sensor panel detects a first touch, the first touch scan can be during a noise period. Instead of determining a location and/or discarding the bad touch scan, the touch controller can send a notification to the charger. In response to receiving the notification, the charger can switch to the touch charge mode. In some examples, the device can include a button, and a force on the button can generate the notification. In some examples, detection of the first touch and/or force on the button can cause the device to exit a sleep state. In some examples, the charger or dock can communicate with the device during the one or more noise periods (such as noise period 730 of FIG. 7A). Communication can include transferring data such as a notification of the charger coupled to the device through one or more communication lines.

Figure 9:
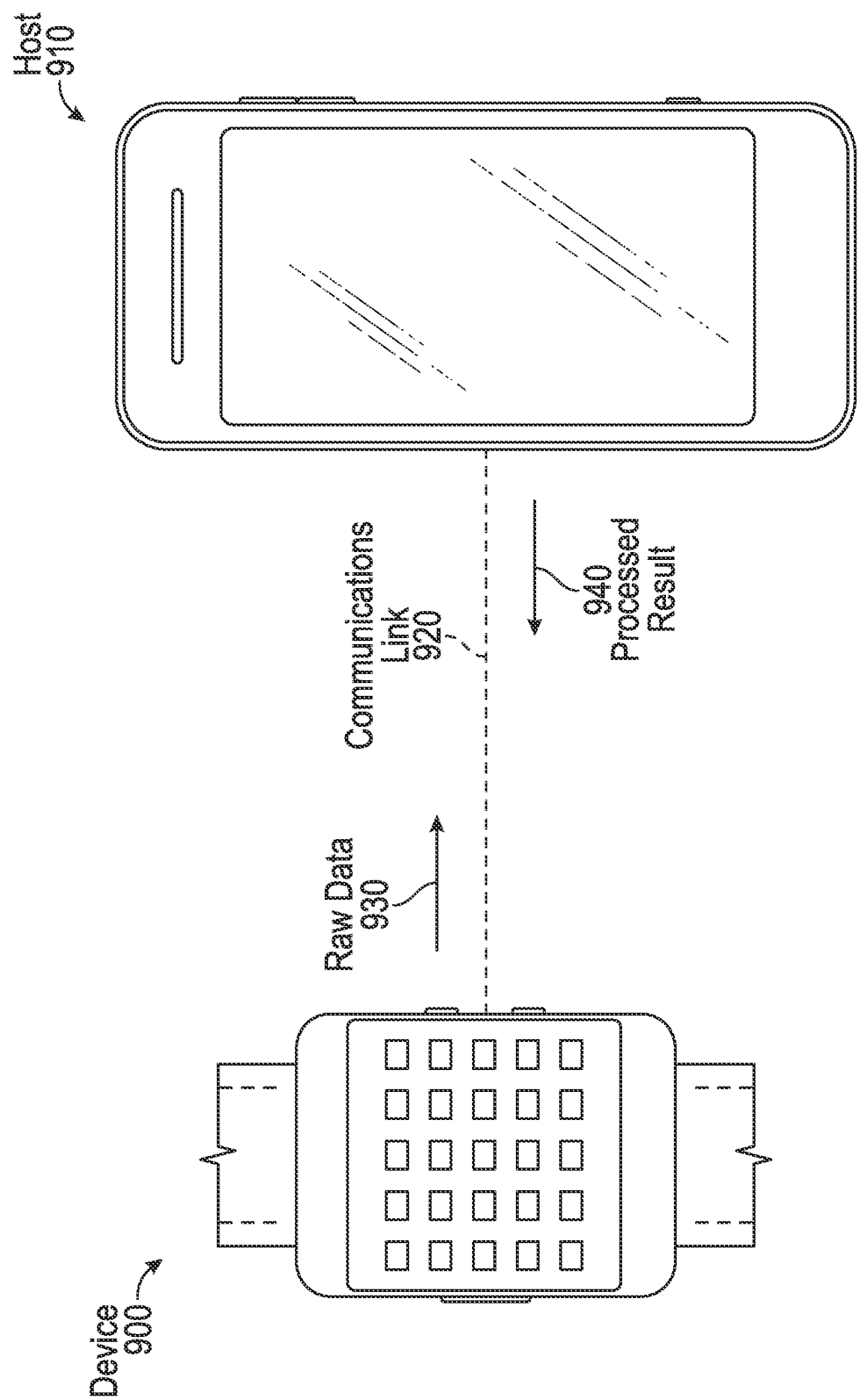
FIG. 9 illustrates an exemplary configuration in which a device is connected to a host according to examples of the disclosure.

In some examples, the host processor or touch controller can determine whether a touch scan is a good touch scan or a bad touch scan. In some examples, the processing need not be performed on the device itself. FIG. 9 illustrates an exemplary configuration in which a device is connected to a host according to examples of the disclosure. Host 910 can be any device external to device 900 including, but not limited to, any of the systems illustrated in FIGS. 1A-1C or a server, for example. Device 900 can be connected to host 910 through communications link 920. Communications link 920 can be any connection including, but not limited to, a wireless connection and a wired connection. Exemplary wireless connections can be Wi-Fi, Bluetooth, Wireless Direct, and Infrared. Exemplary wired connections can be Universal Serial Bus (USB), FireWire, Thunderbolt, or any connection requiring a physical cable.

In operation, instead of processing the information on device 900 itself, device 900 can send raw data 930 over communications link 920 to host 910. Host 910 can receive raw data 930, and host 910 can process the information. Processing the information can include determining whether a touch scan is a good touch scan or a bad touch scan or dynamically changing the scan period, the touch scan frequency, the number of touch scans within a touch scan time, and/or the inductive charging frequency. In some examples, host 910 can process false touches, and can discard false touches without generating a notification to device 900. Host 910 can also include storage or memory for tracking good touch scans and bad touch scans. Host 910 can send the processed result 940 or related information back to device 900. Based on the processed result 940, device 900 can notify the user or adjust its operation accordingly. By offloading the processing and/or storage of the information, device 900 can conserve space and power enabling device 900 to remain small and portable, as space that could otherwise be required for processing logic can be freed up on the device.

In some examples, a method of scanning a touch sensor panel is disclosed. The method may comprise: acquiring data from a plurality of touch sensors; determining whether the data includes noise, the noise generated by a charger; and discarding the data when the data includes the noise. Additionally or alternatively to one or more examples disclosed above, in other examples, the determination includes: determining a curve of a touch profile from the acquired data; determining a shape of the curve; and comparing the shape of the curve to the shape of a historical touch profile. Additionally or alternatively to one or more examples disclosed above, in other examples, the curve is a Gaussian curve. Additionally or alternatively to one or more examples disclosed above, in other examples, the determination further includes determining a slope of the curve and using the slope in the comparison. Additionally or alternatively to one or more examples disclosed above, in other examples, the determination includes determining a full-width half-maximum of the curve. Additionally or alternatively to one or more examples disclosed above, in other examples, the method further comprises determining a number of scans including the noise and a total number of scans during a scan period. Additionally or alternatively to one or more examples disclosed above, in other examples, the method further comprises dynamically changing at least one of a scan period, a scan frequency, and a number of touch scans within the scan period. Additionally or alternatively to one or more examples disclosed above, in other examples, the method further comprises generating an indication of a first touch. Additionally or alternatively to one or more examples disclosed above, in other examples, the acquiring data includes acquiring data for a plurality of touch scans, and wherein the determining whether the data includes noise includes a time based method.

In some examples, a method of a first device communicating with a second device is disclosed. The method may comprise: sending, to a second device, one or more touch values from sense circuitry; and receiving, from the second device, at least one of a noise-free touch image, scan period, and a number of touch scans within a scan period.

In some examples, a touch sensor panel is disclosed. The touch sensor panel may comprise: sensing circuit configured to acquire data from a plurality of touch sensors; logic configured to determine whether the data includes noise and discard the data when the data includes noise, wherein the noise is generated by a charger. Additionally or alternatively to one or more examples disclosed above, in other examples, the logic is further configured to determine a curve of a touch profile from the acquired data, determine a shape of the curve, and compare the shape of the curve to the shape of a historical touch profile. Additionally or alternatively to one or more examples disclosed above, in other examples, the historical touch profile includes a predetermined curve. Additionally or alternatively to one or more examples disclosed above, in other examples, the logic is further configured to determine a slope of the curve and using the slope for the comparison. Additionally or alternatively to one or more examples disclosed above, in other examples, the logic is further configured to determine a full-width half-maximum of the curve. Additionally or alternatively to one or more examples disclosed above, in other examples, the logic is further configured to determine a number of scans including the noise and a total number of scans during a scan period. Additionally or alternatively to one or more examples disclosed above, in other examples, the logic is further configured to dynamically change at least one of a scan period, a scan frequency, and a number of touch scans within the scan period. Additionally or alternatively to one or more examples disclosed above, in other examples, the logic is further configured to generate an indication of a first touch.

In some examples, a charger is disclosed. The charger may comprise logic configured for dynamically changing a duty cycle of a charging period. Additionally or alternatively to one or more examples disclosed above, in other examples, the duty cycle of the charging period is less than a duty cycle of a scan period of a touch sensor panel.

While various examples have been described above, it should be understood that they have been presented by way of example only, and not by way of limitation. Although examples have been fully described with reference to the accompanying drawings, the various diagrams may depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, and whether or not such features are presented as being part of a described example. Thus, the breadth and scope of the present disclosure should not be limited by any of the above-described examples.

What is claimed is:

1. A method of scanning a touch sensor panel, comprising:
acquiring touch data from a plurality of touch sensors during at least one of charge and charge-free periods, the charge and charge-free periods occurring while the touch sensor panel is coupled to a charger;
determining whether the touch data was acquired during at least one of the charge periods, wherein the at least one of the charge periods includes noise received from the charger;
discarding the touch data when the touch data was acquired during the at least one of the charge periods;
in accordance with the touch data including an indication of a touch on the touch sensor panel:
generating and transmitting a first notification to the charger to operate with charge periods having a first duty cycle; and
in accordance with the touch data including an indication of an absence of a touch on the touch sensor panel:
generating and transmitting a second notification to the charger to operate with charge periods having a second duty cycle, the second duty cycle greater than the first duty cycle.

2. The method of claim 1, wherein the determination of whether the touch data was acquired during at least one of the charge periods further includes:
comparing at least a portion of the touch data to a capacitance value from at least one of the plurality of touch sensors, wherein the at least a portion of the touch data is associated with the at least one of the plurality of touch sensors.

3. The method of claim 1, wherein the plurality of touch sensors are incorporated into a first device, the method further comprising:
sending, to a second device, external to the first device, the acquired touch data; and
receiving, from the second device, at least one of a noise-free touch image, scan period, and a number of touch scans within a scan period associated with the acquired touch data.

4. The method of claim 1, wherein:
the first duty cycle is based on a touch sensing duty cycle of the touch sensor panel.

5. The method of claim 1, wherein the determination of whether the touch data was acquired during at least one of the charge periods includes:
determining a curve of a touch profile from the acquired touch data;
determining a shape of the curve; and
comparing the shape of the curve to a shape of a historical touch profile.

6. The method of claim 5, wherein the curve is a Gaussian curve.

7. The method of claim 5, wherein the determination of whether the touch data was acquired during at least one of the charge periods further includes:
one or more of determining a slope of the curve and using the slope in the comparison, and determining a full-width half-maximum of the curve.

8. The method of claim 1, further comprising determining a number of scans including the touch data acquired during the charge-free periods.

9. The method of claim 8, further comprising dynamically changing at least one of a scan period, a scan frequency, and a number of touch scans within the scan period based on the determined number of scans acquired during the charge-free periods.

10. A touch sensor panel comprising:
sensing circuitry configured to acquire touch data from a plurality of touch sensors during at least one of the charge and charge-free periods, the charge and charge-free periods occurring while the touch sensor panel is coupled to a charger; and
a processor configured to:
determine whether the touch data was acquired during at least one of the charge periods, wherein the at least one of the charge periods includes noise generated by the charger;
discard the touch data when the touch data was acquired during the at least one of the charge periods;
in accordance with the touch data including an indication of a touch on the touch sensor panel:
generate and transmit a first notification to the charger to operate with charge periods having a first duty cycle; and
in accordance with the touch data including an indication of an absence of a touch on the touch sensor panel:
generate and transmit a second notification to the charger to operate with charge periods having a second duty cycle, the second duty cycle greater than the first duty cycle.

11. The touch sensor panel of claim 10, wherein the touch sensor panel is configured with a duty cycle of scan periods greater than or equal to a duty cycle of charge periods of the charger when the touch sensor panel is coupled to the charger.

12. The method of claim 10, wherein:
the first duty cycle is based on a touch sensing duty cycle of the touch sensor panel.

13. The touch sensor panel of claim 10, wherein the processor is further configured to determine a curve of a touch profile from the acquired touch data, determine a shape of the curve, and compare the shape of the curve to a shape of a historical touch profile.

14. The touch sensor panel of claim 13, wherein the historical touch profile includes a predetermined curve.

15. The touch sensor panel of claim 13, wherein the processor is further configured to:
perform one or more operations of determining a slope of the curve used for the comparison and determining a full-width half-maximum of the curve.

16. The touch sensor panel of claim 10, wherein the processor is further configured to determine a number of scans including the touch data acquired during the charge-free periods.

17. The touch sensor panel of claim 16, wherein the processor is further configured to dynamically change at least one of a scan period, a scan frequency, and a number of touch scans within the scan period based on the determined number of scans acquired during the charge-free periods.

18. A method of charging a touch sensor panel with a charger, the method comprising:

receiving a first notification from the touch sensor panel, wherein the first notification includes an indication of a touch on the touch sensor panel;

in accordance with receiving the first notification, operating the charger with charge periods having a first duty cycle, the first duty cycle less than a duty cycle of a scan period of the touch sensor panel;

receiving a second notification from the touch sensor panel, wherein the second notification includes an indication of an absence of a touch occurring on the touch sensor panel; and in accordance with receiving the second notification, operating the charger with charge periods having a second duty cycle, the second duty cycle greater than the first duty cycle.

* * * * *